United States Patent Office 3,634,325
Patented Jan. 11, 1972

3,634,325
POLYIMIDE FROM 3,4-DICARBOXY-1,2,3,4-TET-
RAHYDRO - 1 - NAPHTHALENE SUCCINIC
DIANHYDRIDE
Roland Ralph Di Leone, Rowayton, and Howard Robert
Lucas, Greenwich, Conn., assignors to American Cyanamid Company, Stamford, Conn.
No Drawing. Filed Aug. 27, 1964, Ser. No. 392,635
Int. Cl. C08g 20/32
U.S. Cl. 260—47 CP                                  20 Claims

ABSTRACT OF THE DISCLOSURE

A polyimide of a diamine, 3,4-dicarboxy-1,2,3,4-tetrahydro-1-naphthalenesuccinic dianhydride and a different dianhydride of an organic tetracarboxylic acid.

---

This invention relates to polyimides produced by the interreaction of (1) a diamine, (2) 3,4-dicarboxy-1,2,3,4-tetrahydro-1-naphthalenesuccinic dianhydride and (3) a different dianhydride of an organic tetracarboxylic acid. Still further, this invention relates to the process for preparing such a polyimide. Still further, this invention relates to articles molded from the aforesaid polyimide and to films drawn down from solutions of said polyimide.

One of the objects of the present invention is to produce a polyimide reaction product of (1) a diamine, (2) 3,4-dicarboxy-1,2,3,4-tetrahydro-1-naphthalenesuccinic dianhydride and (3) a different dianhydride of an organic tetracarboxylic acid, wherein the mol percent ratio of (2):(3) is between about 35:65 and 65:35, respectively. A further object of the present invention is to produce a class of polyimide reaction products which are moldable and molded articles having a plurality of highly desirable properties. A further object of the present invention is to produce self-supporting films as well as coating films bonded to a substrate from the polyimides of the present invention. These and other objects of the present invention will be discussed in greater detail hereinbelow.

The polyimide reaction products of the present invention are prepared by the interaction of three essential reactants. The first reactant is a diamine which may be either an aliphatic diamine or an aromatic diamine. When the ultimate end use of these polyimides is in the area of a molded article wherein high heat strength is required, the diamines should be aromatic inasmuch as the aliphatic diamines give molded articles which have a lesser degree of heat strength. On the other hand, if the molded article is to be used in an area in which heat strength is of no moment, the aliphatic diamines will be highly acceptable. Among the aliphatic diamines which may be used in preparing the polyimides of the present invention are ethylene diamine, propylene diamines, butylene diamines, pentane diamines, hexane diamines and the like. Among the aromatic diamines which may be used to produce the polyimides of the present invention are m-phenylene diamine,
p-phenylene diamine,
benzidine,
3,4-diaminodiphenyl ether,
4,4'-diaminodiphenylsulfide,
4,4'-diaminodiphenylpropane,
4,4'-diaminodiphenylsulfone,
4,3'-diaminobenzanilide,
3,4'-diaminobenzanilide,
3,3'-diaminobenzanilide,
3,5-diaminobenzanilide,
4,4'-diaminodiphenylmethane,
4,4'-diaminodiphenyl ether and the like. Obviously, these diamines may be used either singly or in combination with one another and mixtures of the aliphatic and aromatic amines may be used if a balance of desirable properties is being sought. The amount of diamine or diamines used to react with the mixture of dianhydrides to produce the polyimide reaction products of the present invention will be calculated stoichiometrically so as to provide substantially one mole of diamine per mole of the mixture of the dianhydrides. Small departures both above and below these stoichiometrical calculations may be used without departing of the spirit of the present invention.

The second component used in producing the polyimide reaction products of the present invention is 3,4-dicarboxy - 1,2,3,4 - tetrahydro-1-naphthalenesuccinic dianhydride. The compound 3,4-dicarboxy-1,2,3,4-tetrahydro-1-naphthalenesuccinic dianhydride will be referred to hereinbelow sometimes as tetralin dianhydride for the sake of simplicity and sometimes by the symbol TDA for the sake of brevity. The TDA produced according to the process of the present invention is prepared by forming a particular adduct of styrene and maleic anhydride by heat reacting these components in an atmosphere of nitric oxide. In carrying out the process, the maleic anhydride may be heated at a temperature between about 30° C. and 150° C. and preferably between about 50° C. and 110° C. during which time nitric oxide is forced through the maleic anhydride if the temperature is high enough to provide molten maleic anhydride or as a blanket over the maleic anhydride if said anhydride is in a solid state. When the maleic anhydride has been heated and contacted with the nitric oxide, monomeric styrene is then added and as the solution is formed between the maleic anhydride and the styrene, the nitric oxide can then be bubbled through the solution so as to provide an intimate atmospheric contact of the nitric oxide with the maleic anhydride-styrene solution. As the heating step continues and the TDA is formed, it precipitates out of the solution as a solid material. This precipitating step continues until substantially all of the TDA is produced. In this reaction two moles of maleic anhydride are reacted with one mole of styrene. For this reason one will generally use a mole ratio of styrene to maleic anhydride of about 1:2 respectively. Ordinarily to insure the best yields, one would use a slight excess of the maleic anhydride such as about 10–20% over and beyond the stoichiometrical amount calculated to completely react with the styrene. Excess quantities of the styrene may also be used if desired particularly when the process is carried out at the lower temperature, i.e., below the melting point of the maleic anhydride so as to provide a solvent for the maleic anhydride and a medium from which the desired product is precipitated. This process of forming the TDA is an adduct type of reaction following a classical Diels-Alder type of reaction. Since the styrene at elevated temperatures is susceptible to homopolymerization as well as copolymerization with the maleic anhydride, the nitric oxide is used to inhibit the tendency toward polymer formation and may for that reason be classed in this instance as a polymerization inhibitor. The nitric oxide has been found in this particular instance to be an exceedingly effective inhibitor against polymerization since the end product resulting from the reaction between the maleic anhydride and the styrene contains the TDA and unreacted maleic anhydride and/or styrene but no measureable or detectable amount of polymeric material.

The third component used in the preparation of the polyimide reaction products of the present invention is a different dianhydride of an organic tetracarboxylic acid. A comparatively limited number of such dianhydrides is available commercially and only a few additional dianhydrides have been disclosed in the literature which are not available commercially insofar as it is known. Among the dianhydrides which are different from the TDA which may be used with the TDA in the preparation of the polyimides of the present invention are pyromellitic dianhydride, 3,3',4,4'-benzophenone tetracarboxylic dianhydride, and 1,2,3,4-cyclopentane tetracarboxylic dianhydride, 2,2-bis(3,4-dicarboxyphenyl)propane dianhydride, bis(3,4-dicarboxyphenyl)ether dianhydride, cyclobutane dianhydride, 1-methyl-7,8-diphenyl-bicyclo[222]-7-octane,2,3,5,6-tetracarboxylic dianhydride, 1,4,5,8-naphthalene tetracarboxylic dianhydride and the like. The 1,2,3,4-cyclopentane tetracarboxylic acid is disclosed in Alder et al. C.A. vol. 50. 1956 pp. 14572–3, inclusive. The dianhydride of 1,2,3,4-cyclopentanetetracarboxylic acid is disclosed in a New Product Data Sheet circulated by Copolymer Rubber & Chemical Corporation, P.O. Box 2591, Baton Rouge, La., which data sheet carries the publication date of June 1964. The data sheet indicates that the dianhydride is identified for the sake of brevity as CPDA which is indicated to be a trademark owned by Copolymer Rubber & Chemical Corporation. Said data sheet further indicates certain of the physical properties of the CPDA and further shows its structural formula.

The mol percentages of the TDA and the dianhydride different from the TDA used in the polyimide of the present invention may be varied over a fairly wide range while still achieving highly desirable properties in the ultimate polyimide reaction product. For instance, one may use from about 35 mole percent of the TDA to a corresponding 65 mol percent of the different dianhydride. Correspondingly, one may use between about 65 mole percent of the TDA and 35 mole percent of the different dianhydride. It is preferred to make use of about 50 mole percent of each of the dianhydrides and when a mixture of the different dianhydrides is used, it is preferred that 50 mole percent of the TDA be used with 50 mole percent of the mixture of the different dianhydrides. By way of further amplification, however, it should be pointed out that the mole percentages of the TDA to the dianhydride different from the TDA may be 40:60, 45:55, 55:45, 60:40, respectively.

In the practice of the process of the present invention, it is necessary to make use of a polar solvent in order to achieve the polyamide reaction product which is then converted to the polyimide. This use of the polar solvent is necessary inasmuch as the three essential reactants entering into the ultimate polyimide reaction product are normally solid and need to be dispersed in a solvent so as to permit interreactions to take place at the respective reaction sites of the diamine and dianhydride molecules. Among the polar solvents which may be used in the practice of the process of the present invention are pyridine, dimethylformamide, dimethylacetamide, dimethylsulfoxide and the like. These polar solvents could be referred to as an inert solvent in that they do not effect the characteristic of the final product and in fact are not present as such in any interreacted fashion in the ultimate polyimide reaction product, although in the course of the preparation of the polyimide particularly in the polyamide stage, they enter into and participate in the reaction thereby assisting in the formation of the intermediates. The amount of reactants used in the inert polar solvent is by no means critical but in order to make the handling of the reaction solution facile the amount of solids in the solvent should be between about 20% and 40% by weight and preferably 30% by weight based on the total weight of the reaction solution.

The molecular weight of the polyimide reaction products of the present invention will vary from about 200,000 to 400,000 depending upon a plurality of variables including such variables as the choice of the diamine e.g. aromatic or aliphatic, the choice of the dianhydride different from the TDA and the reaction conditions. The molecular weight determinations have been measured by the light scattering technique which is well-known in the art and has been published in the literature.

Since the reaction between the diamines and the mixtures of the dianhydrides in the polar solvent is substantially spontaneous, no catalyst is necessary or desired. Instead, upon dissolution of these three principal reactants in the polar solvent and upon the elevation of the temperature by exotherm, the reaction proceeds spontaneously. It should not be permitted to get out of hand, however, and if cooling becomes necessary, such steps should be taken to achieve that end. During the first part of the reaction of the three principal reactants in the polar solvent, a polyamide-acid is prepared which is soluble in the polar solvent. In order to remove the polyamide-acid from solution, it is necessary to add to the solution a non-solvent for a polyamide-acid including a non-solvent for the polyimides of the present invention. These non-solvents include such materials as ethyl acetate, acetone, methyl ethyl ketone, diethyl ketone, methyl isobutyl ketone, dioxane and the like. After the polyamide-acid is precipitated from solution by the addition of said solution slowly to a non-solvent, the polyamide-acid is then converted to the polyimide by heating at temperatures between about 200 and 250° C. for three to four hours under vacuum.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

Into a suitable reaction vessel equipped with stirrer and thermometer there is introduced 80.07 parts (0.4 mole) of 4,4'-diaminodiphenyl ether dissolved in 470 parts of pyridine. A mixture of 60.05 parts (0.2 mole) of 3,4-dicarboxy - 1,2,3,4-tetrahydro-1-naphthalenesuccinic dianhydride and 64.45 parts (0.2 mole) of 3,3',4,4'-benzophenone tetracarboxylic dianhydride is added slowly to the agitated solution over a period of four hours. The temperature is kept below 35° C. during the course of the reaction. A viscous solution resulted which is diluted with 189 parts of pyridine. The resulting polyamide-acid is precipitated in ethyl acetate and converted to the polyimide by heating at 200° C. for two hours under vacuum and 250° C. for an additional two hours under vacuum. The resulting polyimide was moldable. The polyimide was compression molded at 320° C. to yield a tough but flexible molded article. The inherent viscosity of the polyimide as a 0.5% solution in dimethyl formamide is 0.31.

EXAMPLE 2

Example 1 was repeated in substantially all details except that in the place of the 4,4'-diaminodiphenyl ether there was used 4,4'-diaminodiphenylmethane. The resultant polyimide was moldable and when molded in a compression molding machine at 320° C. it produced a molded article which was tough and flexible.

EXAMPLE 3

Example 1 was repeated again substantially in all reaction conditions except that the reactants were as follows: 0.3 mole of TDA, 0.3 mole of 3,3',4,4'-benzophenone tetracarboxylic dianhydride, 0.3 mole of 1,2,3,4-cyclopentane tetracarboxylic dianhydride and 0.9 mole of 4,4'-diaminodiphenyl methane. The resultant polyimide was a moldable composition and when molded as above, produced a tough but flexible molded article.

EXAMPLE 4

Example 1 is repeated in substantially all essential details except that in the place of the 0.5 mole of the 3,3',4, 4'-benzophenone tetracarboxylic dianhydride, there was utilized 0.5 mole of pyromellitic dianhydride. The resulting polyimide was moldable and when converted to a molded article, was hard. The properties of the polyimides of each of the above examples are shown in the following table.

| | DTL,a | Izod b | RH (M) c | Flex st., 23° C.d | Flex st., 200° C.d | Flex mod., 23° C.e | Flex mod., 200° C.e | Tensile, 23° C.f | Elong, 23° g | Dil. const., 10³ cps./ 10³ cps. h | Diss. factor, 10³ cps./ 10⁶ cps. i |
|---|---|---|---|---|---|---|---|---|---|---|---|
| Polymer: | | | | | | | | | | | |
| 1 | 248 | 1.4 | 113 | 26,300 | 13,100 | 510,000 | 360,000 | 17,600 | 14.4 | 3.45/3.31 | .0031/.010 |
| 2 | 256 | 1.4 | 117 | 22,000 | 10,900 | 420,000 | 310,000 | 14,300 | 7.7 | 3.45/3.34 | .0025/.0030 |
| 3 | 260 | 0.89 | 117 | | | | | | | 3.86/3.69 | .0032/.016 |
| 4 | 241 | 0.23 | 117 | 7,400 | | 520,000 | | 3,000 | 1.4 | 3.57/3.41 | .0034/.013 | a Deflection temperature under load.
b Izod notched impact.
c Rockwell hardness (M) scale.
d Flexural strength.
e Flexural modulus.
f Tensile strength.
g Elongation.
h Dielectric constant.
i Dissipation factor.

EXAMPLE 5

Example 1 is repeated again in substantially all details except that the reactants used are 0.5 mole of 3,4-dicarboxy - 1,2,3,4 - tetrahydro - 1 - naphthalenesuccinic dianhydride, 0.5 mole of 3,3',4,4'- benzophenone tetracarboxylic dianhydride and 1.0 mole of m-phenylene diamine. The resulting polyimide is a moldable composition and when molded, there is produced a tough article.

EXAMPLE 6

Example 5 is repeated in substantially all details except that in the place of the 3,3',4,4'-benzophenone tetracarboxylic dianhydride, there was substituted 0.5 mole of pyromellitic dianhydride. The resulting polyimide is a moldable material and produced molded articles with comparable properties.

EXAMPLE 7

Example 6 is repeated in substantially all details except that in the place of the pyromellitic dianhydride there is substituted 0.5 mole of 1,2,3,4-cyclopentane tetracarboxylic dianhydride. The resulting polyimide is a moldable composition nad when molded, produced a molded article having comparable properties to those set forth hereinabove.

We claim:

1. A polyimide of (1) a diamine, (2) 3,4-dicarboxy-1,2,3,4-tetrahydro-1-naphthalenesuccinic dianhydride and (3) a different dianhydride of an organic tetracarboxylic acid, wherein the mol percent ratio of (2):(3) is between about 35:65 and 65:35, respectively.

2. A polyimide of (1) a diamine, (2) 3,4-dicarboxy-1,2,3,4-tetrahydro-1-naphthalenesuccinic dianhydride and (3) 3,3',4,4'-benzophenone tetracarboxylic dianhydride, wherein the mol percent ratio of (2):(3) is between about 35:65 and 65:35, respectively.

3. A polyimide of (1) a diamine, (2) 3,4-dicarboxy-1,2,3,4-tetrahydro-1-naphthalenesuccinic dianhydride and (3) 1,2,3,4 - cyclopentanetetracarboxylic dianhydride, wherein the mol percent ratio of (2):(3) is between about 35:65 and 65:35, respectively.

4. A polyimide of (1) a diamine, (2) 3,4-dicarboxy-1,2,3,4-tetrahydro-1-naphthalenesuccinic dianhydride and (3) pyromellitic dianhydride, wherein the mol percent ratio of (2):(3) is between about 35:65 and 65:35, respectively.

5. A polyimide of (1) a diamine, (2) 3,4-dicarboxy-1,2,3,4-tetrahydro-1-naphthalenesuccinic dianhydride and (3) a different dianhydride of an organic tetracarboxylic acid, wherein the mol percent ratio of (2):(3) is about 50:50.

6. A polyimide of (1) a diamine, (2) 3,4-dicarboxy-1,2,3,4-tetrahydro-1-naphthalenesuccinic dianhydride and (3) 3,3',4,4'- benzophenone tetracarboxylic dianhydride, wherein the mol percent ratio of (2):(3) is about 50:50.

7. A polyimide of (1) a diamine, (2) 3,4-dicarboxy-1,2,3,4-tetrahydro-1-naphthalenesuccinic dianhydride and (3) 1,2,3,4 - cyclopentanetetracarboxylic dianhydride, wherein the mol percent ratio of (2):(3) is about 50:50.

8. A polyimide of (1) a diamine, (2) 3,4-dicarboxy-1,2,3,4-tetrahydro-1-naphthalenesuccinic dianhydride and (3) pyromellitic dianhydride, wherein the mol percent ratio of (2):(3) is about 50:50.

9. A polyimide of (1) 4,4'-diaminodiphenyl ether, (2) 3,4-dicarboxy-1,2,3,4-tetrahydro-1-naphthalenesuccinic dianhydride and (3) a different dianhydride of an organic tetracarboxylic acid, wherein the mol percent ratio of (2):(3) is between about 35:65 and 65:35, respectively.

10. A polyimide of (1) 4,4'-diaminodiphenyl ether, (2) 3,4 - dicarboxy-1,2,3,4-tetrahydro-1-naphthalenesuccinic dianhydride and (3) 3,3',4,4'-benzophenone tetracarboxylic dianhydride, wherein the mol percent ratio of (2):(3) is between about 35:65 and 65:35, respectively.

11. A polyimide of (1) 4,4'-diaminodiphenyl ether, (2) 3,4 - dicarboxy-1,2,3,4-tetrahydro-1-naphthalenesuccinic dianhydride and (3) 1,2,3,4-cyclopentanetetracarboxylic dianhydride, wherein the mol percent ratio of (2):(3) is between about 35:65 and 65:35, respectively.

12. A polyimide of (1) 4,4'-diaminodiphenyl ether, (2) 3,4 - dicarboxy-1,2,3,4-tetrahydro-1-naphthalenesuccinic dianhydride and (3) pyromellitic dianhydride, wherein the mol percent ratio of (2):(3) is between about 35:65 and 65:35, respectively.

13. A polyimide of (1) 4,4'-diaminodiphenyl methane, (2) 3,4 - dicarboxy-1,2,3,4-tetrahydro-1-naphthalenesuccinic dianhydride and (3) a different dianhydride of an organic tetracarboxylic acid, wherein the mol percent ratio of (2):(3) is between about 35:65 and 65:35, respectively.

14. A polyimide of (1) 4,4'-diaminodiphenyl methane, (2) 3,4 - dicarboxy-1,2,3,4-tetrahydro-1-naphthalenesuccinic dianhydride and (3) 3,3'4,4'-benzophenone tetracarboxylic dianhydride, wherein the mol percent ratio of (2):(3) is between about 35:65 and 65:35, respectively.

15. A polyimide of (1) 4,4'-diaminodiphenyl methane, (2) 3,4 - dicarboxy-1,2,3,4-tetrahydro-1-naphthalenesuccinic dianhydride and (3) 1,2,3,4-cyclopentanetetracarboxylic dianhydride, wherein the mol percent ratio of (2):(3) is between about 35:65 and 65:35, respectively.

16. A polyimide of (1) 4,4'-diaminodiphenyl methane, (2) 3,4 - dicarboxy-1,2,3,4-tetrahydro-1-naphthalenesuccinic dianhydride and (3) pyromellitic dianhydride, wherein the mol percent ratio of (2):(3) is between about 35:65 and 65:35, respectively.

17. A polyimide of (1) m-phenylene diamine, (2) 3,4-dicarboxy-1,2,3,4-tetrahydro-1-naphthalenesuccinic dianhydride and (3) a different dianhydride of an organic tetracarboxylic acid, wherein the mol percent ratio of (2):(3) is between about 35:65 and 65:35, respectively.

18. A polyimide of (1) m-phenylene diamine, (2) 3,4-dicarboxy-1,2,3,4-tetrahydro-1-naphthalenesuccinic dianhydride and (3) 3,3',4,4'-benzophenone tetracarboxylic dianhydride, wherein the mol percent ratio of (2):(3) is between about 35:65 and 65:35, respectively.

19. A polyimide of (1) m-phenylene diamine, (2) 3,4-dicarboxy-1,2,3,4-tetrahydro-1-naphthalenesuccinic dianhydride and (3) 1,2,3,4-cyclopentanetetracarboxylic dianhydride, wherein the mol percent ratio of (2):(3) is between about 35:65 and 65:35, respectively.

20. A polyimide of (1) m-phenylene diamine, (2) 3,4-dicarboxy-1,2,3,4-tetrahydro-1-naphthalenesuccinic dianhydride and (3) pyromellitic dianhydride, wherein the mol percent ratio of (2):(3) is between about 35:65 and 65:35, respectively.

References Cited
UNITED STATES PATENTS

| | | | |
|---|---|---|---|
| 3,037,966 | 6/1962 | Chow et al. | 260—78 TF |
| 3,179,633 | 4/1965 | Endrey | 260—78 TF |
| 3,179,634 | 4/1965 | Edwards | 260—78 TF |

HAROLD D. ANDERSON, Primary Examiner

U.S. Cl. X.R.

117—161 P; 161—223; 260—30.2, 30.8 DS, 32.4, 65, 78 TF

UNITED STATES PATENT OFFICE
CERTIFICATE OF CORRECTION

Patent No. 3,634,325　　　　　Dated January 11, 1972

Inventor(s) Roland Ralph Di Leone and Howard Robert Lucas

It is certified that error appears in the above-identified patent and that said Letters Patent are hereby corrected as shown below:

Table - Column 5 and 6

Caption, column 10 - "Dil. const., $10^3$ cps./ $10^3$ cps.$^h$" should read -- Dil. const., $10^3$ cps./ $10^6$ cps.$^h$ --

Column 5, Line 45

"nad" should read -- and --

Signed and sealed this 6th day of June 1972.

(SEAL)
Attest:

EDWARD M. FLETCHER, JR.　　　　　ROBERT GOTTSCHALK
Attesting Officer　　　　　　　　　Commissioner of Patents